United States Patent
Goto et al.

(10) Patent No.: US 7,881,605 B2
(45) Date of Patent: Feb. 1, 2011

(54) CAMERA WITH BUILT-IN PROJECTOR AND PROJECTOR DEVICE

(75) Inventors: Takao Goto, Shinagawa-ku (JP); Nobuaki Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 134 days.

(21) Appl. No.: 12/073,004

(22) Filed: Feb. 28, 2008

(65) Prior Publication Data

US 2008/0212957 A1   Sep. 4, 2008

(30) Foreign Application Priority Data

Mar. 2, 2007  (JP) .............. 2007-052503
Mar. 30, 2007 (JP) .............. 2007-090690
Mar. 30, 2007 (JP) .............. 2007-090692

(51) Int. Cl.
*G03B 21/00* (2006.01)
(52) U.S. Cl. ............ 396/430; 396/539; 348/333.1
(58) Field of Classification Search ............ 396/430
See application file for complete search history.

(56) References Cited

U.S. PATENT DOCUMENTS 6,390,628 B1   5/2002  Fujimori et al.
6,587,140 B2 * 7/2003  No ........................ 348/207.2
2002/0176015 A1* 11/2002 Lichtfuss ................ 348/333.1
2003/0038880 A1* 2/2003  No ........................ 348/207.1
2006/0291851 A1* 12/2006 Nozaki et al. ............ 396/429
2008/0024738 A1   1/2008 Nozaki et al.

FOREIGN PATENT DOCUMENTS

| JP | A-7-28164 | 1/1995 |
|---|---|---|
| JP | A-2000-147343 | 5/2000 |
| JP | A-2000-147650 | 5/2000 |
| JP | A-2002-369050 | 12/2002 |
| JP | A-2004-347711 | 12/2004 |
| JP | A-2005-203953 | 7/2005 |
| JP | A-2006-145812 | 6/2006 |

\* cited by examiner

*Primary Examiner*—W. B. Perkey
*Assistant Examiner*—Bret Adams
(74) *Attorney, Agent, or Firm*—Miles & Stockbridge P.C.

(57) ABSTRACT

A camera with a built-in projector includes: a camera unit equipped with photographing components including an optical system; and a projector module equipped with a projecting optical system, with an optical axis extending along a longer side of the projector module running substantially parallel to an optical axis of the camera unit extending along a longer side of the camera unit.

15 Claims, 9 Drawing Sheets

CAMERA WITH BUILT-IN PROJECTOR AND PROJECTOR DEVICE

INCORPORATION BY REFERENCE

The disclosures of the following priority applications are herein incorporated by reference:
Japanese Patent Application No. 2007-052503 filed Mar. 2, 2007
Japanese Patent Application No. 2007-090690 filed Mar. 30, 2007
Japanese Patent Application No. 2007-090692 filed Mar. 30, 2007

BACKGROUND OF THE INVENTION

1. Field of the Invention

The present invention relates to a camera and a projector device equipped with a projector module.

2. Description of Related Art

Japanese Laid Open Patent Publication No. 2002-369050 discloses a digital camera equipped with a built-in projector module.

The overall size of a camera with a built-in projector or a projector device that includes a projector module and other components, tends to be large.

SUMMARY OF THE INVENTION

A camera with a built-in projector according to a 1st aspect of the present invention includes: a camera unit equipped with photographing components including an optical system: and a projector module equipped with a projecting optical system, with an optical axis extending along a longer side of the projector module running substantially parallel to an optical axis of the camera unit extending along a longer side of the camera unit.

According to a 2nd aspect of the present invention, in the camera with a built-in projector according to the 1st aspect, it is preferable that the camera unit and the projector module are disposed such that the optical axis extending along the longer side of the camera unit and the optical axis extending along the longer side of the projector module run substantially perpendicular to a longer side of a main body of the camera with the built-in projector.

According to a 3rd aspect of the present invention, in the camera with a built-in projector according to the 1st aspect, the camera unit and the projector module may be disposed adjacent to each other.

According to a 4th aspect of the present invention, the camera with a built-in projector according to the 2nd aspect may further include a battery chamber in which a power source battery is housed, and the battery chamber, the projector module and the camera unit may be disposed in sequence from one end of the main body of the camera with the built-in projector along the longer side of the main body in an order of; the battery chamber, the projector module and the camera unit.

According to a 5th aspect of the present invention, in the camera with a built-in projector according to the 4th aspect, it is preferable that the camera unit includes a protruding portion protruding along a direction perpendicular to the longer side of the camera unit; and that the protruding portion is disposed adjacent to the projector module.

According to a 6th aspect of the present invention, the camera with a built-in projector according to the 2nd aspect may further include a battery chamber in which a power source battery is housed, and the battery chamber, the camera unit and the projector module may be disposed in sequence from one end of the main body of the camera with the built-in projector along the longer side of the main body in an order of; the battery chamber, the camera unit and the projector module.

According to a 7th aspect of the present invention, it is preferable that the camera with a built-in projector according to the 1st aspect further includes an electronic flash device, and that a light emitting unit of the electronic flash device is disposed at a position adjacent to the camera unit along a direction perpendicular to the longer side of the camera unit and also adjacent to the projector module along a direction in which the longer side of the projector module extends.

According to a 8th aspect of the present invention, in the camera with a built-in projector according to the 1st aspect, the projector module may include a bend portion that bends projection light, a first portion protruding from the bend portion along a predefined direction and a second portion protruding from the bend portion along a direction intersecting the predefined direction, and is an integrated unit constituted with the bend portion, the first portion and the second portion, and the camera with the built-in projector may further include a first component that is not a component constituting part of the projector module and is disposed at least in part in a space formed by the first portion and the second portion.

According to a 9th aspect of the present invention, in the camera with a built-in projector according to the 8th aspect, it is preferable that the second portion protrudes from the bend portion by an extent greater than an extent to which the first portion protrudes from the bend portion; and the first component is disposed such that a longer side of the first component ranges substantially parallel to a direction along which the second portion protrudes from the bend portion.

According to a 10th aspect of the present invention, the camera with a built-in projector according to the 8th aspect may further include a second component and a third component, which are not components constituting the projector module, and the first component may be disposed in a space enclosed by the first portion and the second portion of the projector module, the second component and the third component.

According to a 11th aspect of the present invention, the camera with a built-in projector according to the 8th aspect may further include an electronic flash device, and the first component may be a capacitor that stores an electrical charge for the electronic flash device.

According to a 12th aspect of the present invention, in the camera with a built-in projector according to the 11th aspect, a light emitting unit of the electronic flash device may be disposed at a position such that the capacitor is enclosed between the first portion of the projector module and the light emitting unit of the electronic flash device.

According to a 13th aspect of the present invention, in the camera with a built-in projector according to the 8th aspect, the first component may be a battery chamber in which a power source battery is housed.

According to a 14th aspect of the present invention, in the camera with a built-in projector according to the 8th aspect, the first component may be a loading unit at which a recording medium for recording image data is loaded.

According to a 15th aspect of the present invention, in the camera with a built-in projector according to the 8th aspect, it is preferable that the projector module assumes a substantially L-shape formed with the first portion, the second portion and the bend portion.

According to a 16th aspect of the present invention, in the camera with a built-in projector according to the 1st aspect, it is preferable that the projector module comprises a housing constituted with a first wall portion ranging along a first direction and a second wall portion continuous to the first wall portion and inclining relative to the first direction and assumes a structure in which light advancing along the first direction is bent at a reflecting surface located on an inside of the second wall portion; and that the camera with the built-in projector further includes a first component that is not a component constituting part of the projector module and is disposed along an outer surface of the second wall portion of the projector module.

According to a 17th aspect of the present invention, in the camera with a built-in projector according to the 16th aspect, the first component may be disposed so as not to protrude beyond the first wall portion.

According to a 18th aspect of the present invention, in the camera with a built-in projector according to the 16th aspect, the first component may be a motor.

A projector device according to a 19th aspect of the present invention includes: a projector module that comprises a bend portion that bends projected light, a first portion protruding from the bend portion along a predefined direction and a second portion protruding from the bend portion along a direction intersecting the predefined direction, and is an integrated unit constituted with the bend portion, the first portion and the second portion; and a first component that is not a component constituting part of the projector module and is disposed at least in part in a space formed by the first portion and the second portion.

According to a 20th aspect of the present invention, in the projector device according to the 19th aspect, it is preferable that the second portion protrudes from the bend portion by an extent greater than an extent to which the first portion protrudes from the bend portion; and that the first component is disposed such that a longer side of the first component ranges substantially parallel to a direction along which the second portion protrudes from the bend portion.

According to a 21st aspect of the present invention, the projector device according to the 19th aspect may further include a second component and a third component, which are not components constituting the projector module, and the first component may be disposed in a space enclosed by the first portion and the second portion of the projector module, the second component and the third component.

According to a 22nd aspect of the present invention, the projector device according to the 19th aspect may further include: a photographic optical system; and an imaging unit that captures a subject image formed by the photographic optical system, and the projector module may generate an optical image to be projected based upon data of an image captured at the imaging unit.

According to a 23rd aspect of the present invention, the projector device according to the 22nd aspect may further includes an electronic flash device that emits flash light during a photographing operation, and the first component may be a capacitor that stores an electrical charge for flash light emission at the electronic flash device.

According to a 24th aspect of the present invention, in the projector device according to the 23rd aspect, a light emitting unit of the electronic flash device may be disposed at a position such that the capacitor is enclosed between the first portion of the projector module and the light emitting unit of the electronic flash device.

According to 25th aspect of the present invention, in the projector device according to the 19th aspect, the first component may be a battery chamber in which a power source battery is housed.

According to a 26th aspect of the present invention, in the projector device according to the 19th aspect, the first component may be a loading unit at which a recording medium for recording image data is loaded.

According to a 27th aspect of the present invention, in the projector device according to the 19th aspect, the projector module may assume a substantially L-shape formed with the first portion, the second portion and the bend portion.

A projector device according to a 28th aspect of the present invention include: a projector module that includes a wall portion ranging along a first direction and a second wall portion continuous to the first wall portion and inclining relative to the first direction, bends light advancing along the first direction at a reflecting surface located on an inside of the second wall portion and radiates the bent light outside; and a first component that is not a component constituting part of the projector module and is disposed along an outer surface of the second wall portion of the projector module.

According to a 29th aspect of the present invention, in the projector device according to the 28th aspect, the first component may be disposed so as not to protrude beyond the first wall portion.

According to 30th aspect of the present invention, in the projector device according to the 28th aspect, the first component may be a motor.

According to a 31st aspect of the present invention, the projector device according to the 28th aspect may further include: a photographic optical system; and an imaging unit that captures a subject image formed by the photographic optical system, and the projector module may generate an optical image to be projected based upon data of an image captured at the imaging unit.

DESCRIPTION OF PREFERRED EMBODIMENTS

First Embodiment

Figure 1:
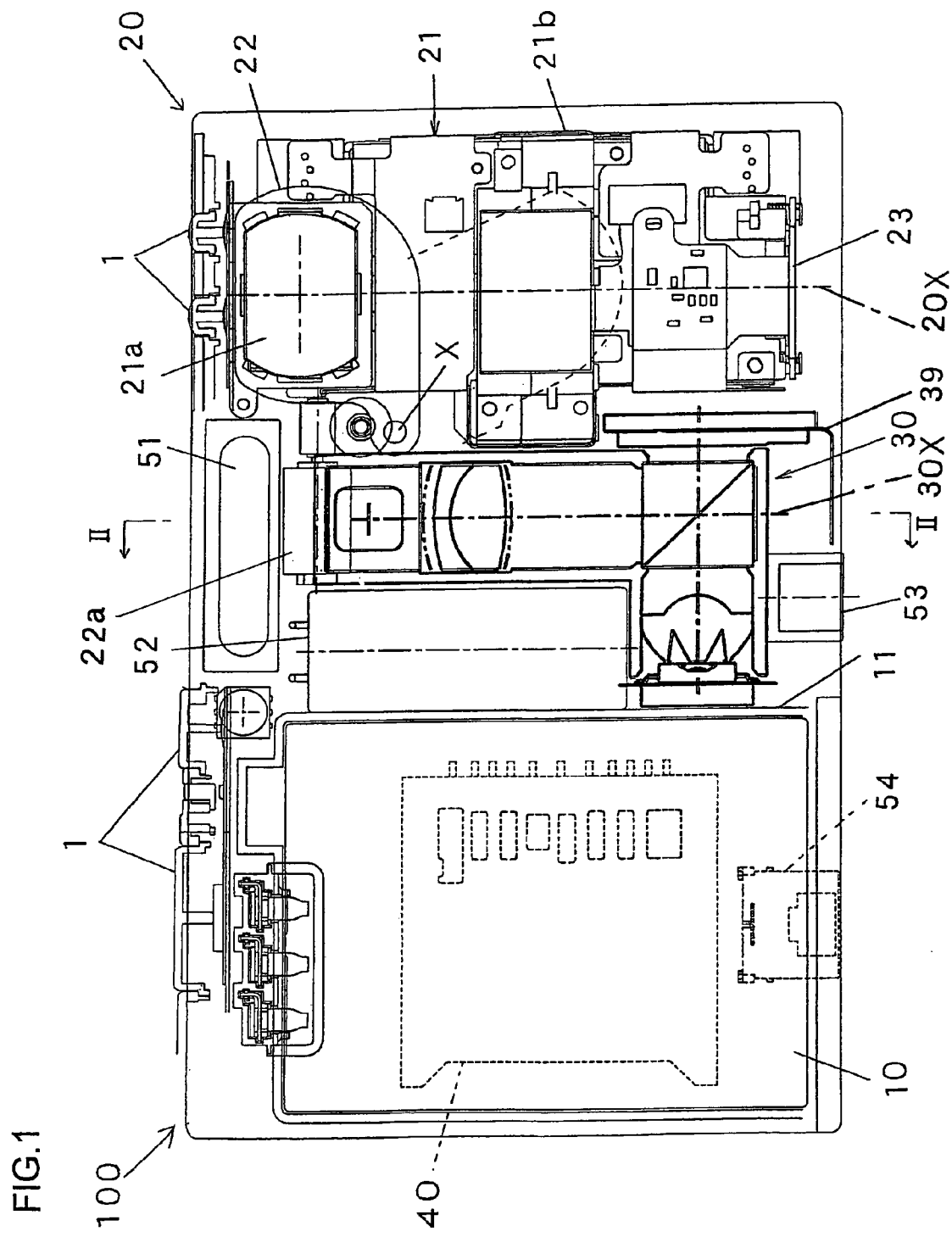
FIG. 1 is a front view showing the internal structure of a digital camera with a built-in projector achieved in a first embodiment of the present invention.
Figure 2:
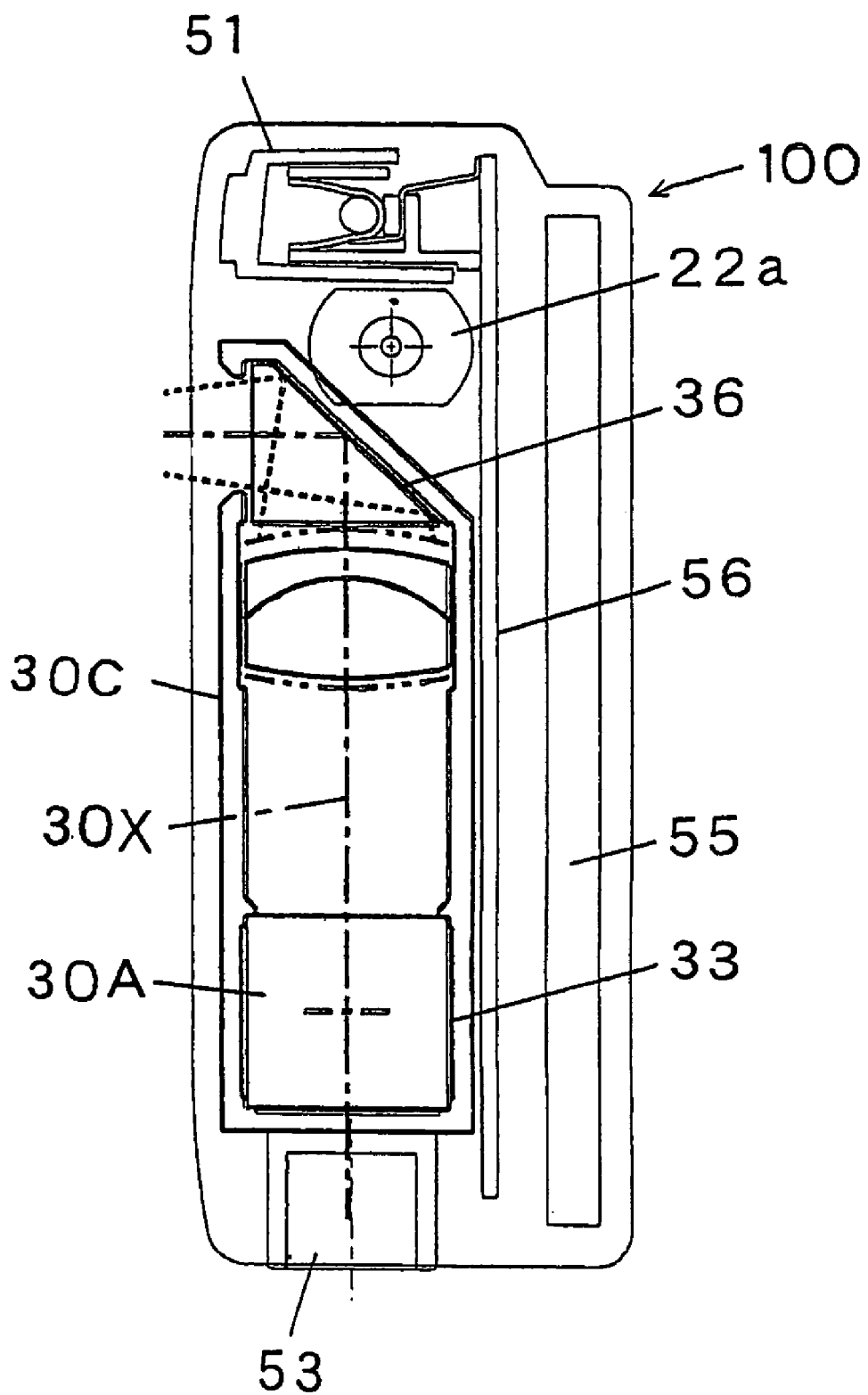
FIG. 2 is a sectional view taken along line II-II in FIG. 1.
Figure 3:
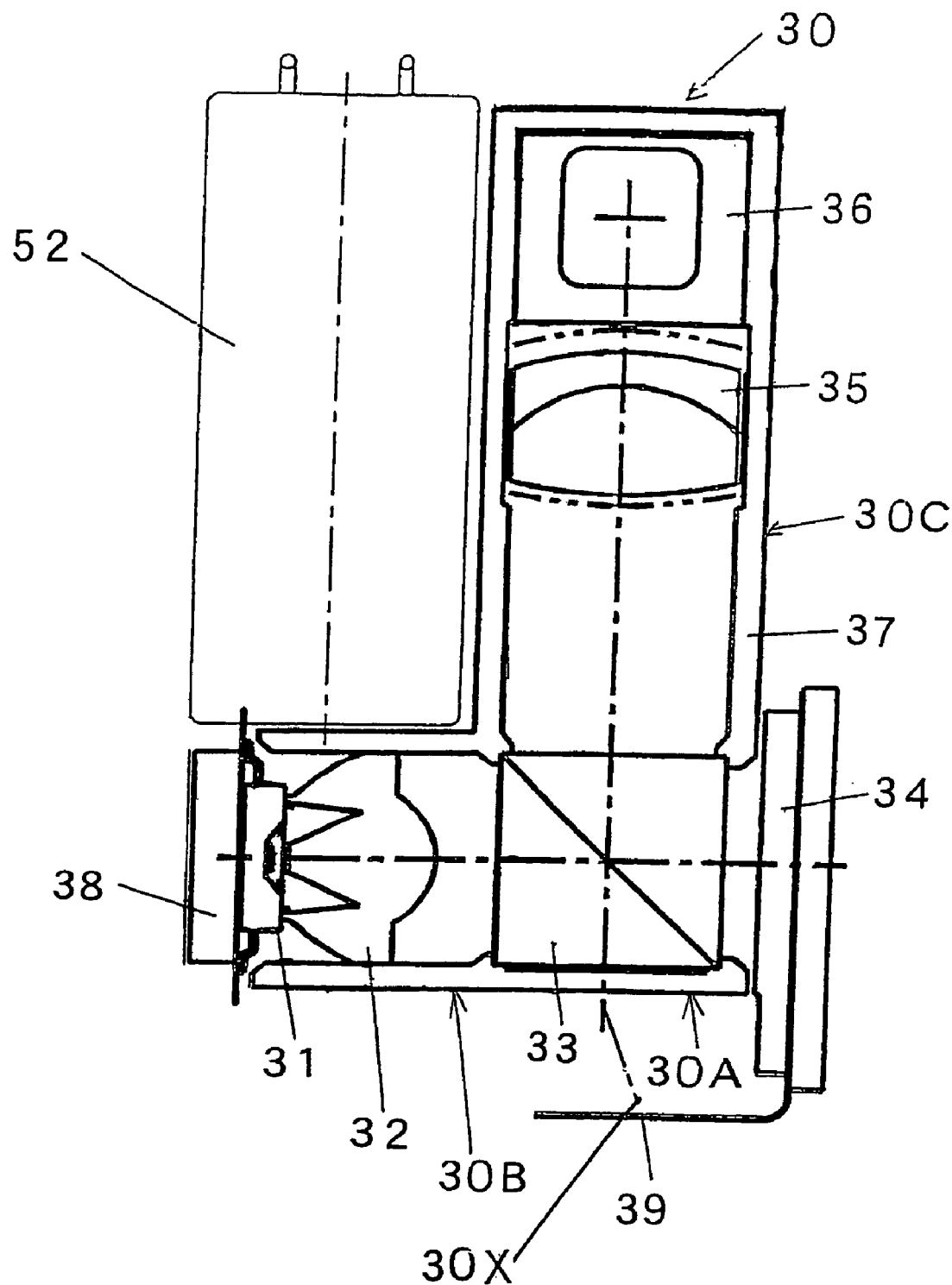
FIG. 3 shows a projector module in FIG. 1 in an enlargement.

A digital camera with a built-in projector as achieved in the first embodiment of the present invention is now explained in reference to FIGS. 1 through 3.

FIG. 1 is a front view of the internal structure of the digital camera achieved in the first embodiment and FIG. 2 is a sectional view taken along line II-II in FIG. 1. At the upper surface of a camera body 100 which assumes a substantially rectangular shape when viewed from the front, a plurality of operation buttons 1 are disposed. Inside the camera body 100, a battery chamber 10 and a camera unit 20 are disposed respectively on the left side and on the right side in FIG. 1, with a projector module 30 disposed between them. The camera unit 20 and the projector module 30 are disposed so that an optical axis 20X extending along the longer side of the camera unit 20 and an optical axis 30X extending along the longer side of the projector module 30 both run substantially perpendicular to the longer side of the camera body 100, i.e., perpendicular to the left-right direction in FIG. 1. A power source battery can be loaded into the battery chamber 10 through, for instance, the bottom surface of the camera body 100.

The camera unit 20 is constituted with a bend photographic optical system 21, a lens barrier 22, an imaging unit 23 and the like. The photographic optical system 21 includes a plurality of lenses, a mirror which is a bend optical system, an optical image blur correction mechanism and the like, all disposed as built-in components thereof. A light flux originating from a photographic subject enters an objective lens 21a exposed at the front of the camera body 100 and is then bent downward at the mirror. The light flux advancing downward is then transmitted through the lens group and enters the imaging unit 23. The optical image blur correction mechanism is built into an image blur correction unit 21b.

The lens barrier 22 is caused to rotate around an axis X by a barrier drive motor 22a (see FIG. 2) so as to assume a protective position at which it covers the front surface of the objective lens 21a or a retracted position at which it is away from the objective lens 21a. The barrier drive motor 22a is controlled by a control circuit (not shown). The control circuit controls the barrier drive motor 22a so that the lens barrier 22 is moved from the protective position to the retracted position in response to an ON signal from a power switch, which is one of the operation switches 1 and that the lens barrier 22 is moved to the protective position in response to an OFF signal from the power switch.

The imaging unit 23 includes an image sensor, an optical filter and the like. The light flux having passed through the photographic optical system 21 is received at the image sensor in the vicinity of the bottom of the camera body 100 and the received light undergoes photoelectric conversion. The output from the image sensor resulting from the photoelectric conversion then undergoes various types of processing and thus, image data are generated. The image data are recorded into a memory card loaded at a card slot 40.

The projector module 30 is described next.

As shown in the enlargement in FIG. 3, the projector module 30 is constituted with a light source 31 such as a high-brightness LED, a condenser lens 32, a polarization beam splitter (hereafter referred to as a PBS) 33, a reflective liquid crystal panel 34 such as a liquid crystal on silicon (LCOS), a projecting lens 35, a mirror 36 and a case 37 housing therein the components listed above. It is to be noted that the reflective liquid crystal panel 34 projects out from the case 37 toward the camera unit 20. Instead of the reflective liquid crystal panel 34, a transmission-type liquid crystal panel may be used.

The projector module 30 includes a bend portion 30A, a horizontal portion 30B protruding sideways from the bend portion 30A and a vertical portion 30C protruding from the bend portion 30A along the vertical direction. The projector module 30 is an integrated unit that includes the bend portion 30A, the horizontal portion 30B and the vertical portion 30C and the case 37 is substantially L-shaped. The light source 31 and the condenser lens 32 are disposed at the horizontal portion 30B, whereas the PBS 33 is disposed at the bend portion 30A. The projecting lens 35 and the mirror 36 are disposed at the vertical portion 30C. In the first embodiment, the projector module 30 is disposed inside the camera body 100 so that the horizontal portion 30B protrudes from the bend portion 30A to the left side, as shown in FIG. 1. Namely, the projector module 30 is disposed so that the horizontal portion 30B protrudes along the direction moving further away from the imaging unit 23 of the camera unit 20, relative to the bend portion 30A. Thus, the light source 31, which is a heat source, is set as far away from the imaging unit 23 as possible so as to minimize the adverse effect of the heat noise on-images.

It is to be noted that an L-shaped heat radiating block (metal block) 38 is placed in tight contact with the light source 31. With part of the heat radiating block 38 set in tight contact with a metal cover of the camera body 100, the heat from the light source 31 can be released to the outside efficiently.

A desired image recorded in the memory card loaded at the card slot 40 is projected to the outside via the projector module 30 adopting the structure described above.

The operations of the digital camera are controlled by a control circuit mounted on a main substrate 56 (see FIG. 2). The control circuit transmits image data read out from the memory card to the liquid crystal panel 34 via a flexible printed circuit board 39 and displays a projection image at the liquid crystal panel 34 based upon the image data. As the light source 31 is turned on in this state, the light from the light source is transmitted through the condenser lens 32 and the PBS 33 and enters the reflective liquid crystal panel 34. The optical image reflected at the reflective liquid crystal panel 34 is bent upward by 90° at the PBS 33 and is projected toward the front of the camera body 100 via the projecting lens 35 and the mirror 36.

In the first embodiment, the camera unit 20 is disposed so as to range along the vertical direction (up/down direction) when the camera body 100 assumes a lateral (sideways) orientation, as shown in FIG. 1. In the projector module 30 assuming a structure in which the condenser lens 32, the PBS 33 and the liquid crystal panel 34 are disposed with short intervals from one another but the PBS 33 and the projecting lens 35 are set over a significant distance from each other so as to assure a sufficient optical path length, the vertical, portion 30C has a greater length than the horizontal portion 30B. Namely, the projector module 30 is disposed so that the optical axis 30X (see FIG. 3) extending along the longer side of the projector module runs parallel to the optical axis 20X (see FIG. 1) extending along the longer side of the camera unit 20. By disposing the projector module 30 and the camera unit 20 toward the right side of the camera body 100, as shown in the figures, with the optical axes 20X and 30X running parallel to each other, the battery chamber 10 located on the left side of the camera body 100 is allowed to take up ample space while minimizing the bulk of the camera.

In addition, a light emitting unit 51 of an electronic flash device is disposed at a position on one side of the camera unit 20, above the projector module 30. Illuminating light from the light emitting unit 51 is radiated to the front through a light emission window located at the front surface of the camera body 100. With the light emitting unit 51 disposed in the space formed by the projector module 30 and the camera unit 20 as described above, the space inside the camera body 100 is utilized more efficiently and since the light emission window is disposed in close proximity to a side of a lens window of the camera unit 20, optimal lighting is assured.

As shown in FIG. 1, a capacitor 52, which stores an electrical charge for flash light emission, is disposed in the triangular space formed by the horizontal portion 30B and the vertical portion 30C of the projector module 30. A side wall 11 of the battery chamber 10 is present to the left of the projector module 30. The capacitor 52 is disposed in the longitudinally-elongated rectangular space enclosed by the horizontal portion 30B, the vertical portion 30C, the light emitting unit 51 and the battery chamber 10. As shown in the figure, the capacitor 52 assumes a shape substantially identical to the shape of the rectangular space, assuring highly efficient utilization of the available space within the camera body 100. This means that the digital camera can be miniaturized to a maximum extent. Furthermore, since this structure allows the light emitting unit 51 and the capacitor 52 to be disposed in close proximity to each other, they can be wired easily and efficiently.

The liquid crystal panel 34 of the projector module 30 protrudes slightly toward the camera unit 20 relative to the vertical portion 30C. In the space formed between this protruding portion and the vertical portion 30C, part of the image blur correction unit 21b of the camera unit 20 is disposed. As a result, further efficiency is achieved in the utilization of the available space.

It is to be noted that, as shown in FIGS. 1 and 2, a tripod seat 53 located at the bottom of the projector module 30, a terminal 54 through which an external device is connected, a liquid crystal monitor 55 at which images and the like are displayed toward the outside and the like are also disposed inside the camera body 100.

An explanation has been given above in reference to the first embodiment on an example in which an image recorded in the memory card loaded at the card slot 40 is projected via the projector module 30. However, the present invention is not limited to this example and it may be adopted in a structure that allows images recorded in an internal memory (not shown) or image data obtained from an external device via the terminal 54 to be projected via the projector module 30.

Variation of the First Embodiment

Figure 4:
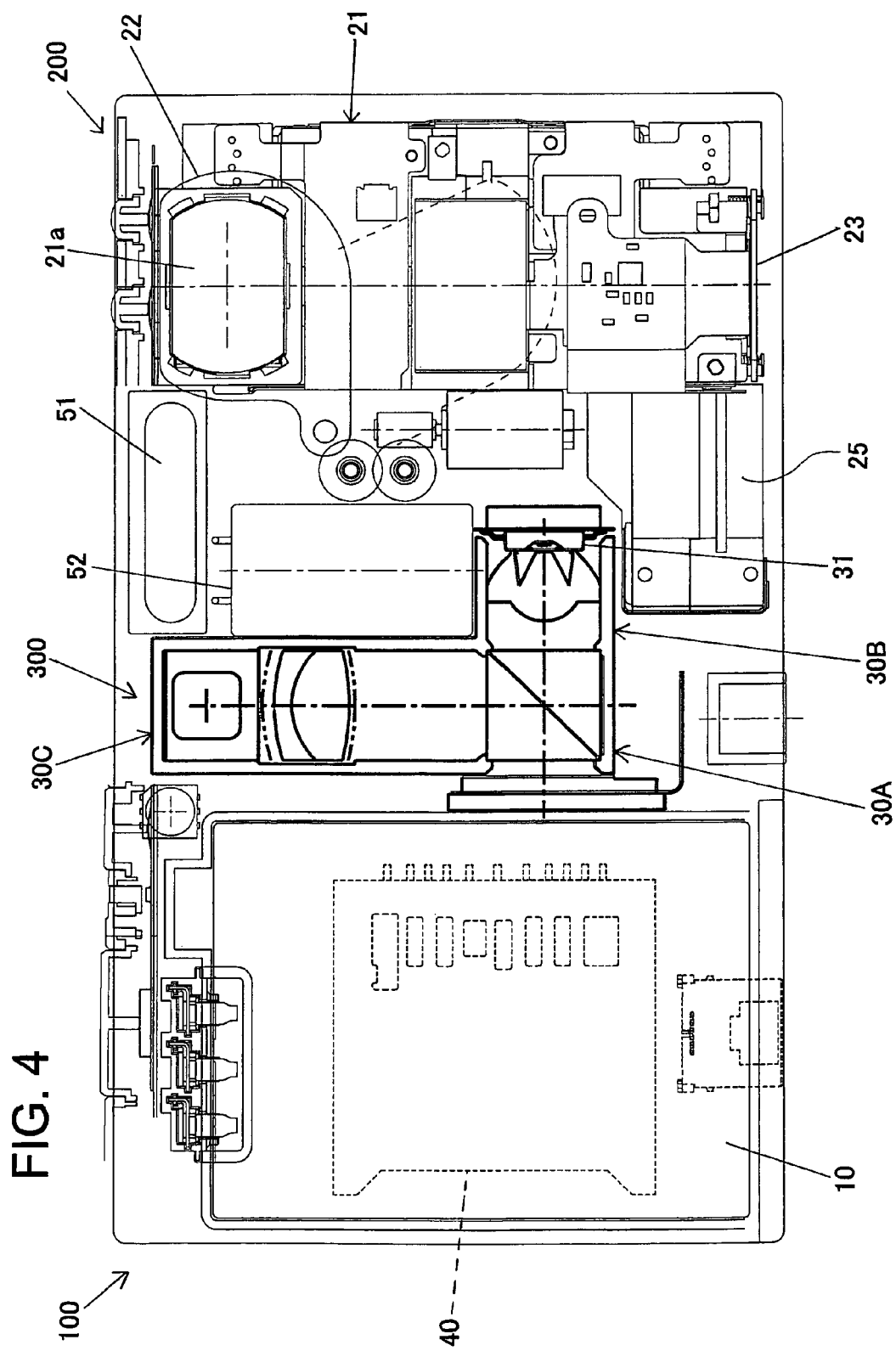
FIG. 4 is a front view showing the internal structure of the digital camera with a built-in projector achieved in a variation of the first embodiment.

A camera unit 200 in a variation of the first embodiment includes a mechanical image blur correction mechanism 25 that corrects image blur by displacing the image sensor of the imaging unit 23, in place of the optical image blur correction mechanism 21b, as shown in FIG. 4. The camera unit 200 includes a vertical portion ranging along the longer side of the camera unit 200 and a horizontal portion protruding along the direction perpendicular to the vertical portion, and assumes an overall L-shape. It is to be noted that the photographic optical system 21 and the imaging unit 23 are disposed at the vertical portion, whereas the mechanical image blur correction mechanism 25 is disposed at the horizontal portion.

In addition, a projector module 300 is disposed so that its horizontal portion 30B protrudes to the right in FIG. 4 from the bend portion 30A. Thus, the light source 31 at the horizontal portion 30B set further toward the camera unit 200 relative to the bend portion 30A.

The capacitor 52, which stores the electrical charge for the flash light emission, is disposed in the space enclosed by the camera unit 200 and the projector module 300. Viewed from above, the camera body 100, the light emitting unit 51 and the capacitor 52 of the electronic flash device, the horizontal portion 30B of the projector module 300 and the mechanical image blur correction mechanism 25 of the camera unit 200 are disposed in the order of; the light emitting portion 51, the capacitor 52, the horizontal portion 30B and the mechanical image blur correction mechanism 25.

Second Embodiment

Figure 5:
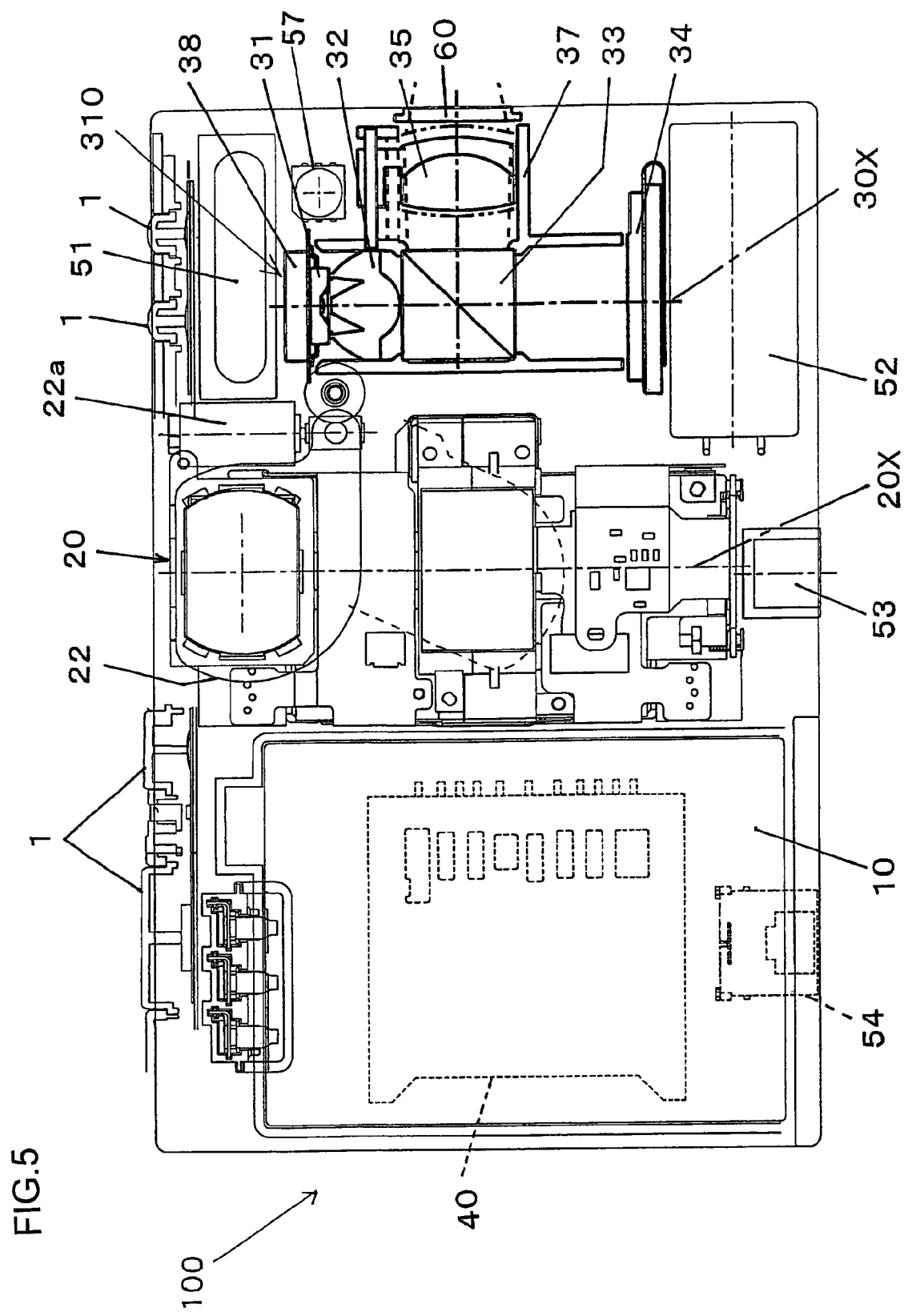
FIG. 5 is a front view showing the internal structure of a digital camera with a built-in projector achieved in a second embodiment.

In reference to FIG. 5, the second embodiment of the present invention is explained. It is to be noted that in FIG. 5, the same reference numerals are assigned to components similar to those in the first embodiment described above and that the following explanation focuses on differences from the first embodiment.

In contrast with the projector module in the first embodiment, a projector module 310 in the second embodiment assumes a structure in which the PBS 33 and the liquid crystal panel 34 are disposed over a significant distance from each other and the PBS 33 and the projecting lens 35 are set over a short distance from each other. As a result, the projector module 310 assumes a substantially T-shape overall.

As shown in FIG. 5, the projector module 310 is disposed at the right end of the camera body 100, with a radiation window formed at the right side surface of the camera body 100 facing opposite the projecting lens 35. Light transmitted through the projecting lens 35 is projected to the right in FIG. 5 via a transparent protective plate 60 fitted in the radiation window. The camera unit 20 is disposed between the projector module 310 and the battery chamber 10.

It is to be noted that a light emitting unit 57 that emits AF auxiliary light is also disposed in the camera body 100.

In the second embodiment described above, too, the projector module 310 and the camera unit 20 are disposed so that the optical axis 20X of the camera unit 20 and the optical axis 30X of the projector module 310 run parallel to each other. As a result, advantages similar to those of the first embodiment are achieved.

Third Embodiment

The following is an explanation of a digital camera with a built-in projector achieved in the third embodiment of the present invention. Since the basic structure of the digital camera achieved in the third embodiment is similar to that of the digital camera in the first embodiment illustrated in FIGS. 1 through 3, its explanation is omitted. The following explanation focuses on differences from the first embodiment.

In the first embodiment, the capacitor 52 is disposed in the space defined by the vertical portion 30C and the horizontal portion 30B of the projector module 30. However, a member other than the capacitor 52 may be disposed in this space. In other words, a component other than a component of the projector module 30 may be disposed in the space formed by the vertical portion 30C and the horizontal portion 30B.

Figure 6:
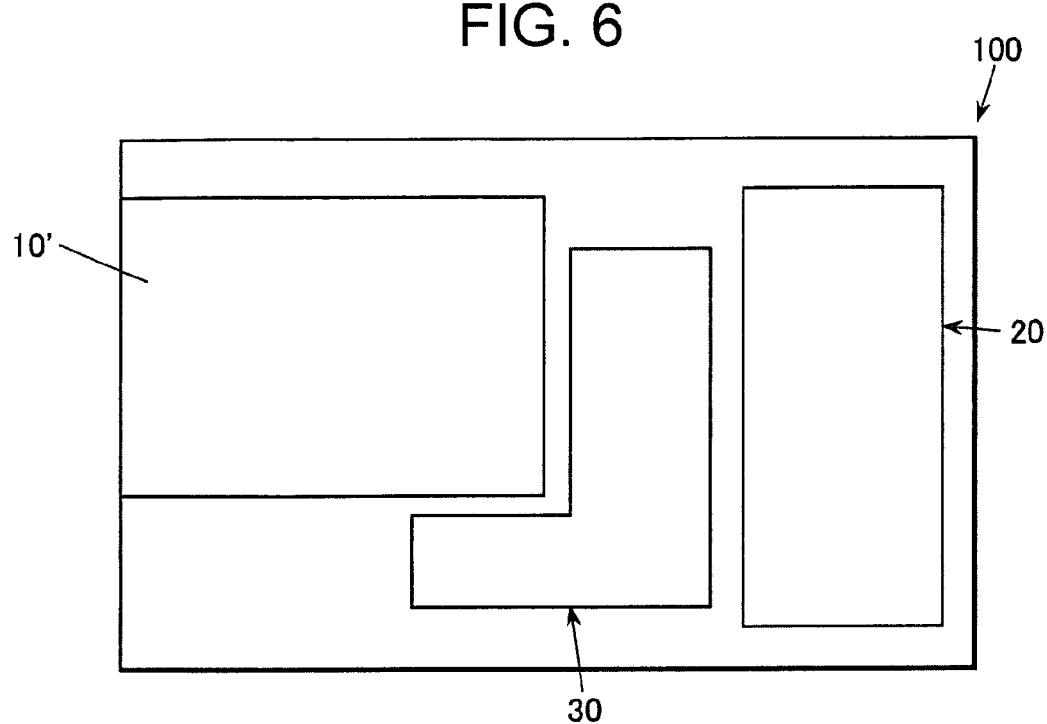
FIG. 6 schematically illustrates the internal structure of a digital camera with a built-in projector achieved in a third embodiment.
Figure 7:
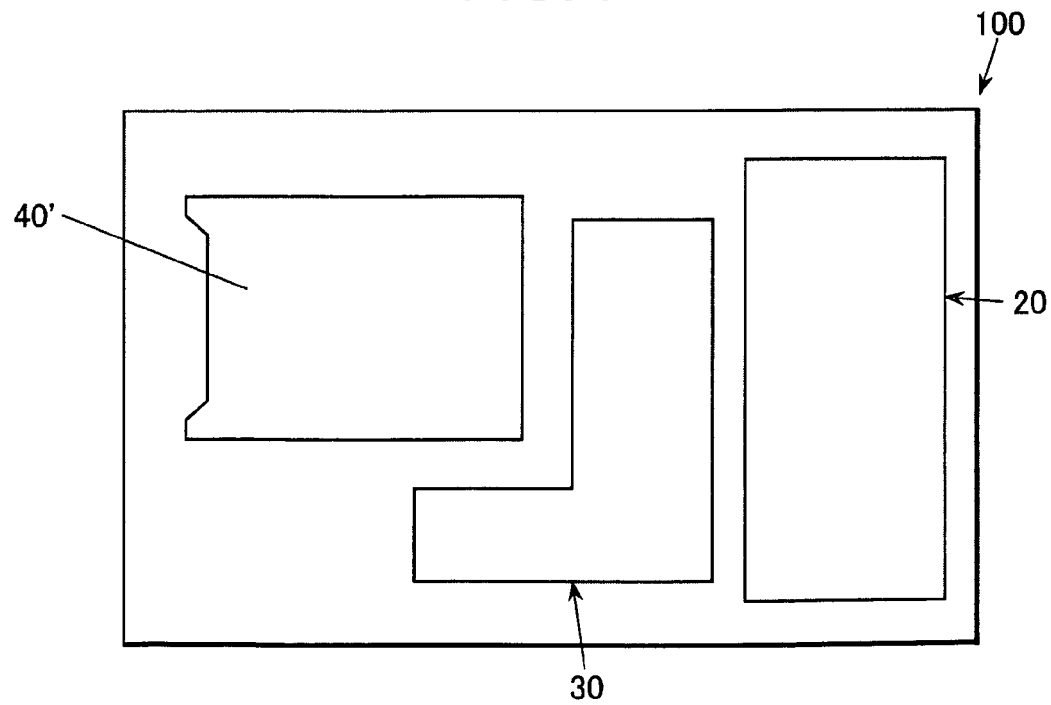
FIG. 7 schematically illustrates an alternative internal structure that may be adopted in the digital camera with a built-in projector in the third embodiment.

FIG. 6 presents an example in which part of a battery chamber 10' is disposed in the space formed by the vertical portion 30C and the horizontal portion 30B. FIG. 7 presents an example in which part of a card slot 40' is disposed in the space formed by the vertical portion 30C and horizontal portion 30B. Alternatively, part of or the entirety of the light emitting unit 51 of the electronic flash device or a motor may be disposed in the space formed by the vertical portion 30C and the horizontal portion 30B.

Figure 8:
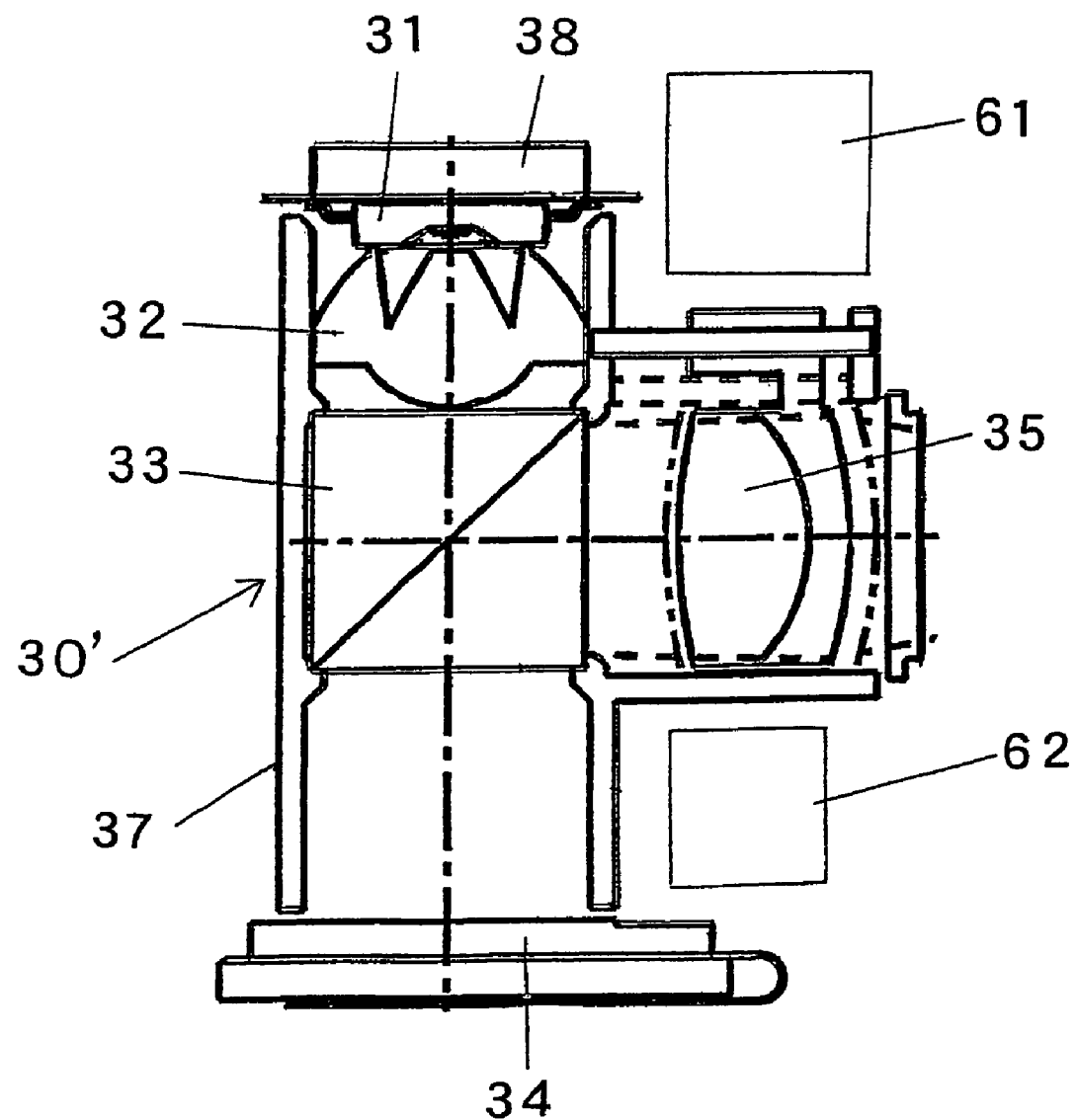
FIG. 8 is an enlargement of a T-shaped projector module.

In addition, the projector module 30 may assume a shape other than the L-shape and a projector module 30' assuming a substantially T-shape, as shown in FIG. 8, may be used. In this case, too, a space is formed by the vertical portion ranging along the longer side of the projector module 30' and the horizontal portion protruding sideways from the vertical portion. By disposing appropriate members 61 and 62 constituting the digital camera respectively in the space formed above the horizontal portion and in the space formed under the horizontal portion, miniaturization of the overall camera can be achieved. The member 61 disposed above the horizontal portion may be, for instance, a light emitting unit, which emits AF auxiliary light.

Fourth Embodiment

The following is an explanation of a digital camera with a built-in projector achieved in the fourth embodiment of the present invention. Since the basic structure of the digital camera achieved in the fourth embodiment is similar to that of the digital camera in the first embodiment illustrated in FIGS. 1 through 3, its explanation is omitted. The following explanation focuses on differences from the first embodiment.

The direction along which an image is projected by the projector module 30, i.e., the direction along which the optical axis of the light reflected at the mirror 36 extends, matches the horizontal direction along which the camera body 100 may be held in a lateral orientation. However, by setting the direction of the optical axis of the light reflected at the mirror 36 with a slight upward offset relative to the horizontal direction, the eclipse of projected light at the surface where the camera is placed can be minimized.

Now, a positional relationship that may be assumed by the projector module 30 and the barrier drive motor 22a, which rotates the lens barrier 22, is explained.

Figure 9:
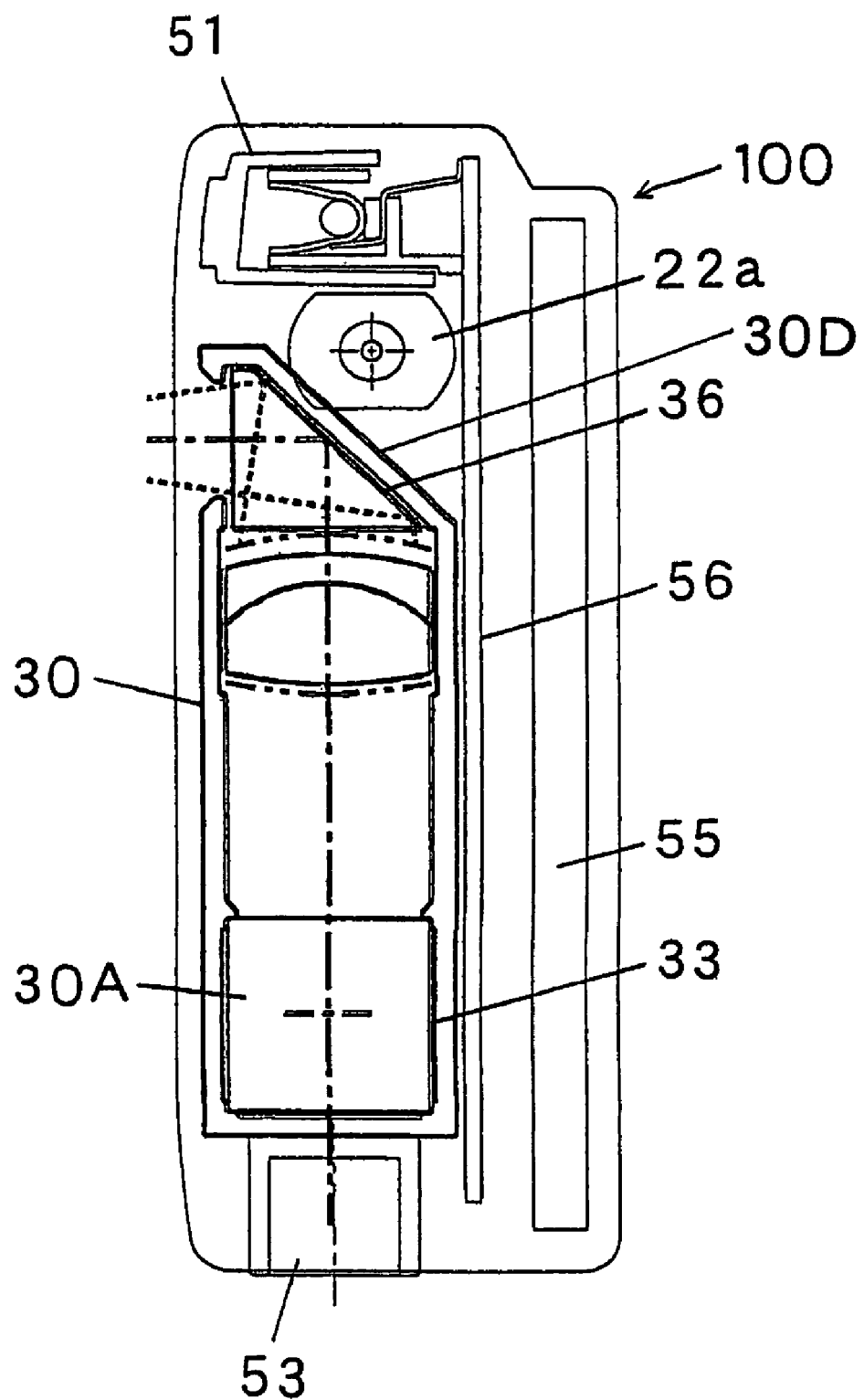
FIG. 9 is a sectional view of a digital camera with a built-in projector achieved in a fourth embodiment.

As shown in FIG. 9, an inclining wall 30D inclining toward the front of the camera body 100, i.e., toward the subject, is formed at the vertical portion 30C of the projector module 30. The mirror 36 is installed on the inside of the inclining wall 30D. In the fourth embodiment, the barrier drive motor 22a is disposed in close proximity along the outer surface of the inclining wall 30D so as to minimize the extent to which the motor 22a protrudes upward and rearward relative to the projector module 30.

The barrier drive motor 22a and the light emitting unit 52 are disposed in this order above the projector module 30, as shown in FIG. 1. By disposing the barrier drive motor 22a along the outer surface of the inclining wall 300, the extent to which the motor 22a protrudes from the upper end of the projector module 30 can be minimized. This, in turn, makes it possible to minimize the distance between the light emitting unit 52 and the projector module 30, thereby minimizing the height of the camera body 100. In addition, as shown in FIG. 9, the barrier drive motor 22a does not protrude along the rearward direction from the projector module 30 at all. Namely, the barrier drive motor 22a is disposed so that it does not project out beyond the rear surface of the projector module 30. As a result, the distance between the main substrate 56 and the projector module 30 can be kept to a minimum so as to minimize the thickness of the camera body 100.

As described above, the barrier drive motor 22a is disposed in close proximity to the inclining portion 30D of the projector module 30 in the fourth embodiment. Instead of the barrier drive motor 22a, a zoom motor that drives the zoom lens included in the photographic optical system 21 or a focus motor that drives the focus lens in the photographic optical system 21 may be disposed in close proximity to the inclining portion 30D. Alternatively, the capacitor 52 may be disposed in close proximity to the inclining portion 30D.

Figure 10:
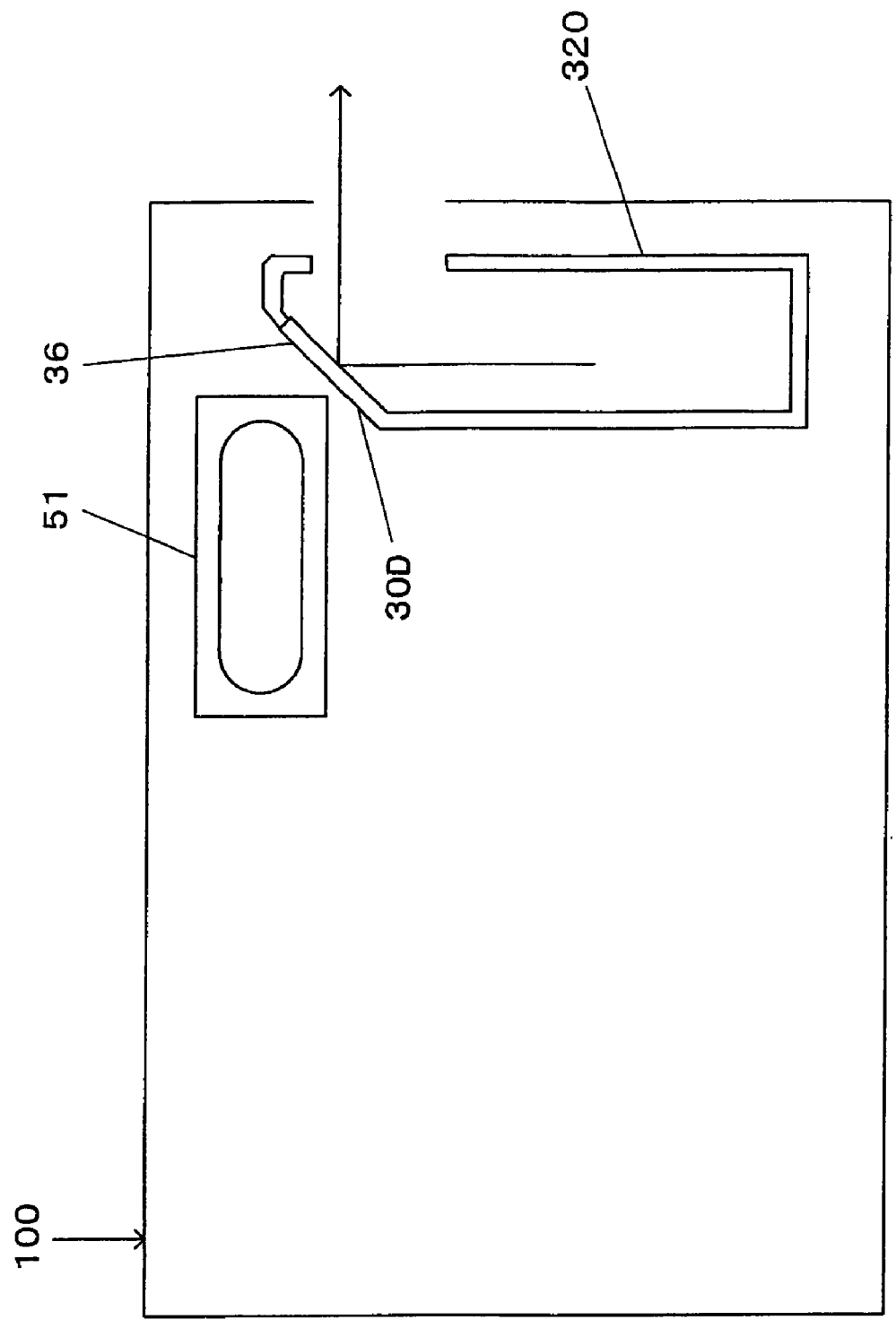
FIG. 10 illustrates a positional relationship that may be assumed by the projector module and the light emitting unit of the electronic flash device.

FIG. 10 illustrate show an image may be projected through a side surface of the camera body 100. A projector module 320 in this example is disposed over the area at the right end of the camera body 100 in FIG. 10. A radiation window through which light transmitted through the projecting lens 35 is radiated to the outside of the camera body 100 is formed at the right side surface of the camera body 100. The light emitting unit 51 of the electronic flash device is disposed at a position that is in close proximity to the outer surface of the inclining wall 30D of the projector module 320.

In the first through fourth embodiments described above, a projector module is invariably installed in a digital camera. However, the present invention is not limited to this example and it may be adopted in a camera-equipped portable telephone that includes a projector module, another type of electronic device that includes a projector module or a device with a built-in projector that does not have a photographing function.

The above described embodiments are examples, and various modifications can be made without departing from the scope of invention.

What is claimed is:

1. A camera, comprising:
   a camera unit equipped with photographing components including an optical system;
   a projector module equipped with a projecting optical system, with an optical axis extending along a longer side of the projector module running substantially parallel to an optical axis of the camera unit extending along a longer side of the camera unit;
   a camera body that houses the camera unit and the projector module; and
   a battery chamber in which a power source battery is housed, wherein:
   the camera unit and the projector module are disposed such that the optical axis extending along the longer side of the camera unit and the optical axis extending along the longer side of the projector module run substantially perpendicular to a longer side of the camera body; and
   the battery chamber, the projector module and the camera unit are disposed in sequence from one end of the camera body along the longer side of the camera body in an order of: the battery chamber, the projector module and the camera unit.

2. A camera according to claim 1, wherein:
   the camera unit and the projector module are disposed adjacent to each other.

3. A camera according to claim 1, wherein:
   the camera unit comprises a protruding portion protruding along a direction perpendicular to the longer side of the camera unit; and
   the protruding portion is disposed adjacent to the projector module.

4. A camera according to claim 1, further comprising:
   an electronic flash device, wherein:
   a light emitting unit of the electronic flash device is disposed at a position adjacent to the camera unit along a direction perpendicular to the longer side of the camera unit and also adjacent to the projector module along a direction in which the longer side of the projector module extends.

5. A camera according to claim 1, wherein:

the projector module comprises a bend portion that bends projection light, a first portion protruding from the bend portion along a predefined direction and a second portion protruding from the bend portion along a direction intersecting the predefined direction, and is an integrated unit constituted with the bend portion, the first portion and the second portion; and the camera includes:

a first component that is not part of the projector module and is disposed at least in part in a space bounded by the first portion and the second portion of the projector module.

6. A camera according to claim 5, wherein:

the second portion protrudes from the bend portion by an extent greater than an extent to which the first portion protrudes from the bend portion; and the first component is disposed such that a longer side of the first component extends substantially parallel to a direction along which the second portion protrudes from the bend portion.

7. A camera according to claim 5, including:

a second component and a third component, which are not parts of the projector module, wherein:

the first component is disposed in a space substantially enclosed by the first portion and the second portion of the projector module, the second component and the third component.

8. A camera according to claim 5, further comprising:

an electronic flash device, wherein:

the first component is a capacitor that stores an electrical charge for the electronic flash device.

9. A camera according to claim 8, wherein:

a light emitting unit of the electronic flash device is positioned such that the capacitor is disposed between the first portion of the projector module and the light emitting unit of the electronic flash device.

10. A camera according to claim 5, wherein:

the first component is the battery chamber.

11. A camera according to claim 5, wherein:

the first component is a loading unit at which a recording medium for recording image data is loaded.

12. A camera according to claim 5, wherein:

the projector module assumes a substantially L-shape formed with the first portion, the second portion and the bend portion.

13. A camera comprising:

a camera unit equipped with photographing components including an optical system;

a projector module equipped with a projecting optical system, with an optical axis extending along a longer side of the projector module running substantially parallel to an optical axis of the camera unit extending along a longer side of the camera unit; and a camera body that houses the camera unit and the projector module; wherein:

the projector module comprises a housing constituted with a first wall portion ranging along a first direction and a second wall portion continuous to the first wall portion and inclining relative to the first direction and assumes a structure in which light advancing along the first direction is bent at a reflecting surface located on an inside of the second wall portion; and the camera further comprises:

a first component that is not a component of the projector module and is disposed along an outer surface of the second wall portion of the projector module.

14. A camera according to claim 13, wherein:

the first component is disposed so as not to protrude beyond the first wall portion.

15. A camera according to claim 13, wherein:

the first component is a motor.

* * * * *